UNITED STATES PATENT OFFICE 2,594,455

PROCESS OF MAKING A DIALKYL PHOSPHORYL MONOETHYL HYDROCARBON PHOSPHONATE

Gennady M. Kosolapoff, Auburn, Ala., assignor to Monsanto Chemical Company, St. Louis, Mo., a corporation of Delaware No Drawing. Application June 3, 1949, Serial No. 97,073

6 Claims. (Cl. 260—461)

This invention provides esters of the phosphate-phosphonate type and also provides a process for producing the same. The present compounds are phosphate-phosphonate esters characterized by the structural formula:

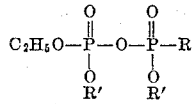

where R is selected from the group consisting of the phenyl, methyl, ethyl, propyl, isopropyl, butyl and isobutyl radicals, and R' is selected from the group consisting of the ethyl, propyl, isopropyl, butyl and isobutyl radicals.

The present compounds are useful as insecticides.

The herein-disclosed compounds may be prepared by the following reaction:

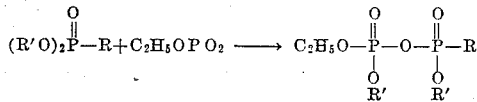

where R and R' have the significance indicated above.

The process is carried out by mixing together the alkyl ester of an aryl or alkyl phosphonic acid in substantially equal molecular proportions. The reaction initially liberates a small amount of heat and is favored by further application of heat to a temperature of from 100° C. to 150° C. The products may be utilized for various purposes without further purification, although if desired they may be additionally purified.

The following examples are given by way of illustration:

Example 1

Diethyl phosphoryl monoethyl benzenephosphonate.—48.8 g. (0.2 mole) of diethyl benzenephosphonate and 21.6 g. (0.2 mole) of ethyl metaphosphate were mixed together. Complete solution occurred with a slight liberation of heat. The reaction mixture was further heated to a temperature of 140°–150° for three and one-half hours and then cooled. During the reaction it is desirable that the reacting mixture be protected against external moisture by suitable drying means.

The product consisting of 60 g. of a pale yellow, mobile oil was obtained; $n_D^{25}=1.4698$.

Example 2

Diethyl phosphoryl monoethyl methanephosphonate.—30.4 g. of diethyl methanephosphonate and 21.6 g. of ethyl metaphosphate were mixed together at room temperature. A slight amount of heat was developed. Heating was continued under reflux conditions at a temperature of approximately 125° for three and one-half hours. The product obtained was a yellowish oil.

Example 3

Diethyl phosphoryl monoethyl ethanephosphonate.—51 g. (0.307 mole) of diethyl ethanephosphonate was mixed homogeneity with 33 g. (0.307 mole) of ethyl metaphosphate and then heated to 147° for five hours.

The product has a refractive index $n_D^{25}=1.4268$.

Example 4

Ethyl butyl phosphoryl monobutyl butanephosphonate.—47.5 g. of dibutyl butanephosphonate (0.19 mole) was mixed with 20.5 g. of ethyl metaphosphate (0.19 mole) and then heated for five hours to 145° C. The product had a refractive index $n_D^{25}=1.4340$.

The present phosphonate esters, when employed as insecticides, have a substantially lower rate of hydrolysis and consequently a longer life than tetraethyl pyrophosphate.

The insecticidal toxicity of the compounds has been determined by tests conducted upon several species of insects. In conducting contact spray tests of the present products an atomizer-type compressed air sprayer was employed for atomizing solutions of the herein-disclosed compounds. Solutions of varying concentrations were employed usually in the presence of a wetting agent, such as sodium dodecylbenzenesulfonate. The wetting agent was generally employed in the concentration of 1 g. of the sodium sulfonate per 5 liters of distilled water.

Contact spray tests upon the aphid, Myzus porosus Sanderson, were conducted upon cultures of the insect maintained on potted rose plants grown in the greenhouse. Individual leaves infested with approximately 100 aphids of various stages of development were employed and sprayed with the compound tested.

The following results were obtained:

*Percent kill of* Myzus porosus *at p. p. m. concentration*

|  | 1000 | 500 | 200 | 100 | 50 | 25 |
|---|---|---|---|---|---|---|
| Compound of Ex. 1 |  |  | 94.5 | 70.6 | 53.5 | 29.6 |
| Compound of Ex. 2 |  |  | 96.2 | 89.6 | 80.8 | 60.9 |
| Compound of Ex. 3 |  |  |  | 98.9 | 88.0 | 74.7 |
| Compound of Ex. 4 | 97.6 | 95.4 | 89.9 | 68.3 | 24.8 |  |

Contact spray tests against adult houseflies (*Musca domestica*) were carried out at various concentrations. The results obtained were as follows:

*Percent kill of* Musca domestica *at p. p. m. concentration*

|  | 5000 | 2500 | 1250 | 25 | 313 |
|---|---|---|---|---|---|
| Compound of Ex. 1 | 97.4 | 86.9 | 50.8 | 33.5 |  |
| Compound of Ex. 2 | 96.3 | 91.6 | 70.7 | 21.5 |  |
| Compound of Ex. 3 | 94.8 | 96.0 | 29.5 |  |  |
| Compound of Ex. 4 | 76.2 | 58.6 |  |  |  |

Tests for residual insecticidal activity of the compounds were also made by exposing adult houseflies for 30 minutes on deposits of the aged compounds supported on glass surfaces, the amount of chemical corresponding to 50 mg. per square foot of surface area. The results of the tests of the aged compound coated surfaces are as follows:

*24 hour mortality of* Musca domestica *after exposure to aged treated surfaces*

|  | Age of Surface ||
|---|---|---|
|  | Two Hours | Five Days |
| Compound of Ex. 1 | 72.8 | 3.1 |
| Compound of Ex. 2 | 61.6 | 1.4 |
| Compound of Ex. 3 | 68.8 | 0.9 |
| Compound of Ex. 4 | 65.6 | 2.2 |

What I claim is:

1. The process which comprises reacting a dialkyl ester of a hydrocarbon phosphonic acid with ethyl metaphosphate and forming a dialkyl phosphoryl monoethyl hydrocarbon phosphonate.

2. The process which comprises mixing a compound having the formula:

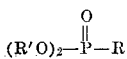

where R is selected from the group consisting of phenyl, methyl, ethyl, propyl, isopropyl, butyl and isobutyl and R' is selected from the group consisting of ethyl, propyl, isopropyl, butyl and isobutyl, with ethyl metaphosphate and producing a compound having the structural formula:

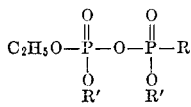

where R and R' have the significance above indicated.

3. The process for producing diethyl phosphoryl monoethyl benzenephosphonate which comprises mixing diethyl benzenephosphonate with ethyl metaphosphate and then heating the mixture.

4. The process for producing diethyl phosphoryl monoethyl methanephosphonate which comprises mixing diethyl methanephosphonate with ethyl metaphosphate and then heating the mixture.

5. The process for producing diethyl phosphoryl monoethyl ethanephosphonate which comprises mixing diethyl ethanephosphonate with ethyl metaphosphate and then heating the mixture.

6. The process for producing ethyl butyl phosphoryl monobutyl butanephosphonate which comprises mixing dibutyl butanephosphonate with ethyl metaphosphate and then heating the mixture.

GENNADY M. KOSOLAPOFF.

REFERENCES CITED

The following references are of record in the file of this patent:

Balarew, Z. Anorg. Chem., vol. 99, pages 191–194 (1917).

Arbusow et al., J. Prakt. Chem., vol. 130, pages 112 and 131 of paper including pages 103 to 132 (1931).

Ludvik et al., J. Econ. Ent., vol. 40, No. 1, February 1947, pages 97–100.